(12) United States Patent
Kyotani et al.

(10) Patent No.: US 7,335,408 B2
(45) Date of Patent: Feb. 26, 2008

(54) CARBON NANOTUBE COMPOSITE MATERIAL COMPRISING A CONTINUOUS METAL COATING IN THE INNER SURFACE, MAGNETIC MATERIAL AND PRODUCTION THEREOF

(75) Inventors: Takashi Kyotani, Miyagi (JP);
Tomonori Ogawa, Miyagi (JP);
Kenichi Ito, Kawasaki (JP); Hideyuki Kikuchi, Kawasaki (JP); Hiroshi Nakao, Kawasaki (JP); Tsugio Kumai, Kawasaki (JP)

(73) Assignees: Fujitsu Limited, Kawasaki (JP);
Tohoku University, Sendai-shi (JP)

( * ) Notice: Subject to any disclaimer, the term of this patent is extended or adjusted under 35 U.S.C. 154(b) by 0 days.

(21) Appl. No.: 10/945,942

(22) Filed: Sep. 22, 2004

(65) Prior Publication Data

US 2005/0255313 A1    Nov. 17, 2005

(30) Foreign Application Priority Data

May 14, 2004  (JP) .............................. 2004-145528

(51) Int. Cl.
*B29D 22/00* (2006.01)
*B32B 1/08* (2006.01)

(52) U.S. Cl. ..................... 428/34.1; 428/367; 428/368; 428/379; 428/398; 977/743; 977/744

(58) Field of Classification Search ............... 428/402, 428/403, 34.1, 367, 368, 379, 398; 977/DIG. 1, 977/743, 744

See application file for complete search history.

(56) References Cited

U.S. PATENT DOCUMENTS 5,916,642 A * 6/1999 Chang ......................... 29/509

5,919,429 A * 7/1999 Tanaka et al. .......... 423/445 B (Continued)

FOREIGN PATENT DOCUMENTS

JP        2000-204471        7/2000

(Continued)

OTHER PUBLICATIONS

Muhl et al., "Magnetic Properties of aligned ferromagnetically filled carbon nanotubes", Highlights 2002, pp. 27-30.*

(Continued)

*Primary Examiner*—H. T. Le
(74) *Attorney, Agent, or Firm*—Westerman, Hattori, Daniels & Adrian, LLP.

(57) ABSTRACT

A carbon nanotube composite material contains a carbon nanotube and a continuous layer of a metal covering the inner surface of the carbon nanotube. It is produced by forming a metallic matrix layer and treating the metallic matrix layer to form plural nanoholes in the metallic matrix layer to thereby form a nanohole structure, the nanoholes extending in a direction substantially perpendicular to the plane of the metallic matrix layer; forming carbon nanotubes inside the nanoholes; and covering inner surfaces of the carbon nanotubes with a continuous layer of a metal. It has a well controlled small size, has excellent and uniform physical properties, is resistant to oxidation of the metal with time, is highly chemically stable, has good durability enabling repetitive use, has good coatability, high wettability and dispersibility with other materials, is easily chemically modified, is easily handled and is useful in various fields.

7 Claims, 13 Drawing Sheets

U.S. PATENT DOCUMENTS

| | | | |
|---|---|---|---|
| 6,129,901 A * | 10/2000 | Moskovits et al. | 423/447.3 |
| 6,361,861 B2 * | 3/2002 | Gao et al. | 428/367 |
| 6,479,028 B1 * | 11/2002 | Kaner et al. | 423/414 |
| 6,878,444 B2 * | 4/2005 | Suzuki et al. | 428/375 |
| 7,238,425 B2 * | 7/2007 | Cumings et al. | 428/403 |
| 2002/0025374 A1 * | 2/2002 | Lee et al. | 427/230 |

FOREIGN PATENT DOCUMENTS

| | | |
|---|---|---|
| JP | 3402032 | 2/2003 |
| JP | 3440591 | 6/2003 |

OTHER PUBLICATIONS

Charlier et al, "Microscopic Growth Mechanisms for Carbon and Boron-Nitride Nanotubes", Applied Physics, A 68, 267-273 (1999).*

N. Grobert et al., "Novel Nanostructures: from Metal-Filled Carbon Nanotubes to MgO Nanoferns", Perspectives of Fullerene Nanotechnology, pp. 11-19, 2002.

Takashi Kyotani et al., "Synthesis of Carbon Nanotube Composite in Nanochannels of an Anodic Aluminum Oxide Film", Bull.Chem. Soc. Japan, 72, pp. 1957-1970 (1999).

* cited by examiner

16

16

CARBON NANOTUBE COMPOSITE MATERIAL COMPRISING A CONTINUOUS METAL COATING IN THE INNER SURFACE, MAGNETIC MATERIAL AND PRODUCTION THEREOF

CROSS-REFERENCE TO RELATED APPLICATIONS

This application is based upon and claims the benefits of the priority from the prior Japanese Patent Application No. 2004-145528, filed on May 14, 2004, the entire contents of which are incorporated herein by reference.

BACKGROUND OF THE INVENTION

1. Field of the Invention

The present invention relates to a carbon nanotube composite material comprising a carbon nanotube and a metal inside thereof, a magnetic material comprising a carbon nanotube and a magnetic metal inside thereof, and production thereof.

2. Description of the Related Art

Carbon nanotubes (hereinafter may be briefly referred to as "CNT") have been used as novel materials in electronic and electric fields and other fields and have been produced, for example, by arc discharging, laser vaporization, thermal chemical vapor deposition (thermal CVD) or plasma chemical vapor deposition (plasma CVD). Such carbon nanotubes produced by these methods are roughly classified as single-layer carbon nanotubes (single wall nanotube; SWNT) comprising a single graphene sheet, and multilayer carbon nanotubes (multi wall nanotube; MWNT) comprising plural graphene sheets.

Focusing attention on excellent physical properties of the carbon nanotubes, studies have been made, for example, on production of composite materials from the carbon nanotubes. For example, the study circle of Kroto, who found a fullerene and is a Novel Prize winner, reported that a carbon nanotube composite material containing iron Fe is prepared by heating ferrocene and a fullerene, in Perspectives of Fullerene Nanotechnology, p. 11-19, 2002; Kluwer Academic Publishers). However, the resulting carbon nanotube composite material produced by this method has a low filling rate of iron (Fe) of several tens of percent, is not satisfactorily controlled in the dimensions such as length and diameter of the carbon nanotube and has insufficient physical properties and practicability as a composite material.

Under these circumstances, Kyotani et al. developed a method for producing a metal-containing carbon tube composite material, which method comprises allowing a carbon nanotube to grow in an anodized aluminum oxide (alumina) nanohole serving as a template by vapor phase carbonization, coating the inside of the grown carbon tube with a metal by immersing in a metal salt, heating and reducing, and fusing and thereby removing the anodized alumina nanohole (T. Kyotani et al., Bull. Chem. Soc. Jpn., 72, 1957 (1999) and Japanese Patent (JP-B) No. 3402032).

The resulting carbon nanotube composite material produced by this method only includes iron (Fe) in a filling ratio of about 50% or less and fails to achieve a high filling ratio of metal. In addition, the carbon nanotube has a relatively long length of about 1 μm or more. Thus, a high-quality carbon nanotube composite material including a metal as a uniform and continuous layer has not yet been provided.

Certain carbon nanotube composite materials are produced by a method of forming a metallic matrix layer in a carbon tube by chemical vapor deposition of an organometal such as nickelocene (Japanese patent Application Laid-Open (JP-A) No. 2000-204471).

However, the resulting carbon nanotube composite material produced by this method only includes iron (Fe) in a filling ratio of about 50% or less and still fails to achieve a high filling ratio of metal. In addition, the carbon tube is open at both of its ends, and the contained metal is susceptible to oxidization and is unstable.

Accordingly, a demand has been made to provide a carbon nanotube composite material and a method for efficiently producing the same, which carbon nanotube composite material has a well controlled short length of 1 μm or less, has excellent and uniform physical properties, is resistant to oxidation of the contained metal with time, is highly chemically stable, has good durability, is capable of using repetitively, has good handleability such as coatability, high wettability and dispersibility with other materials such as polymer binders, is easily chemically modified, is easily handled and can be suitably used in various fields such as electronic and electric materials, magnetic materials and carriers for drug delivery systems.

As magnetic powders for magnetic tapes and magnetic disks, a magnetic powder of needle iron oxide was used at early stages, and, recently, a metal powder or Ba-ferrite powder has been used for recording at high density. For recording at higher density, a demand has been made to provide a magnetic powder that is smaller, has better anisotropy and alignment, exhibits greater residual magnetization and is more chemically stable. An attempt has been made to provide a magnetic recording medium by synthetically preparing an apoferritin, a protein moiety constituting ferritin together with iron, by DNA manipulation, incorporating a magnetic material having desired magnetic properties into the apoferritin to thereby form a protein-coated nano-scale magnetic material, aligning the nano-scale magnetic material in a desired manner utilizing self-organization ability of the protein, and using the same as, for example, a magnetic recording medium (J. Hoinville, A. Bewick, D. Gleeson, R. Jones, O. Kasyutich, E. Mayes, A. Nartowski, B. Warne, J. Wiggins, K. Wong, High density magnetic recording on protein-derived nanoparticles, J. App. Phys., 93 (10), 7187-7189 (2003)). However, the nano-scale magnetic material comprises excessively fine particles and thus invites thermal fluctuation. The thermal fluctuation problem of this material cannot be solved, since its size is limited by the protein structure and cannot be desirably controlled.

Therefore, a demand has been made to provide a novel magnetic material and a method for efficiently producing the same, which magnetic material can be desirably controlled in its size to have a desirable short length and to have a nano-scale size enabling high-density recording, has a great magnetic anisotropy, avoids thermal fluctuation even in high-density recording, has excellent and uniform magnetic properties, is resistant to oxidation with time, is chemically stable, has good coatability, high wettability and dispersibility with other materials such as polymer binders, is easily chemically modified and is handled satisfactorily.

SUMMARY OF THE INVENTION

Under these circumstances, the present invention has been accomplished, and objects of the present invention are as follows.

Specifically, an object of the present invention is to provide a carbon nanotube composite material and a method for efficiently producing the same, which carbon nanotube composite material has a well controlled short length of 1 µm or less, has excellent and uniform physical properties, is resistant to oxidation of the contained metal with time, is highly chemically stable, has good durability, is capable of using repetitively, has good handleability such as coatability, high wettability and dispersibility with other materials such as polymer binders, is easily chemically modified, is easily handled and can be suitably used in various fields such as electronic and electric materials, magnetic materials and carriers for drug delivery systems.

Another object of the present invention is to provide a novel magnetic material and a method for efficiently producing the same, which magnetic material can be desirably controlled in its size to have a desirable short length and to have a nano-scale size enabling high-density recording, has a great magnetic anisotropy, avoids thermal fluctuation even in high-density recording, has excellent and uniform magnetic properties, is resistant to oxidation with time, is chemically stable, has good coatability, high wettability and dispersibility with other materials such as polymer binders, is easily chemically modified and is easily handled.

Specifically, the present invention provides, in an aspect, a carbon nanotube composite material including a carbon nanotube, and a continuous layer of a metal covering an inner surface of the carbon nanotube. Thus, the carbon nanotube composite material has uniform properties derived from the metal, has a high filling ratio (inner coverage ratio) of the metal, highly exhibits the physical properties derived from the metal and is of high quality.

The present invention provides, in another aspect, a carbon nanotube composite material including a sheet; and a plurality of the carbon nanotube composite materials, each of the plurality of the carbon nanotube composite materials being bound to the sheet at its one end and extending in a direction substantially perpendicular to a plane of the sheet. Thus, the carbon nanotube composite material can be suitably used in various fields such as electrodes in field emission displays.

In yet another aspect, the present invention provides a magnetic material including a carbon nanotube; and a continuous layer of a magnetic metal covering an inner surface of the carbon nanotube. Thus, the magnetic material has uniform magnetic properties derived from the magnetic metal. In addition, it has a high filling ratio of the magnetic metal, highly exhibits the magnetic properties derived form the magnetic metal and is of high quality. It has a surface comprising carbon nanotube and is thereby easily chemically modified. Thus, it has more excellent wettability and dispersibility with other materials such as polymer binders, has more satisfactory coatability and handleability than conventional inorganic magnetic powders and can be suitably used, for example, in high-quality magnetic disks and magnetic tapes.

The present invention provides, in yet another aspect, a method for producing the carbon nanotube composite material, including the processes of forming a nanohole structure by forming a metallic matrix layer and treating the metallic matrix layer to form plural nanoholes in the metallic matrix layer, the nanoholes extending in a direction substantially perpendicular to the plane of the metallic matrix layer; forming carbon nanotubes inside the nanoholes; and covering inner surfaces of the carbon nanotubes with a continuous layer of a metal. Thus, the method efficiently produces the carbon nanotube composite material of the present invention.

In addition and advantageously, the present invention provides a method for producing the magnetic material, including the processes of forming a nanohole structure by forming a metallic matrix layer and treating the metallic matrix layer to form plural nanoholes in the metallic matrix layer, the nanoholes extending in a direction substantially perpendicular to a plane of the metallic matrix layer; forming carbon nanotubes inside the nanoholes; and covering inner surfaces of the carbon nanotubes with a continuous layer of a magnetic metal. Thus, the method efficiently produces the magnetic material of the present invention.

Further objects, features and advantages of the present invention will become apparent from the following description of the preferred embodiments with reference to the attached drawings.

DESCRIPTION OF THE PREFERRED EMBODIMENTS

Figure 1A:
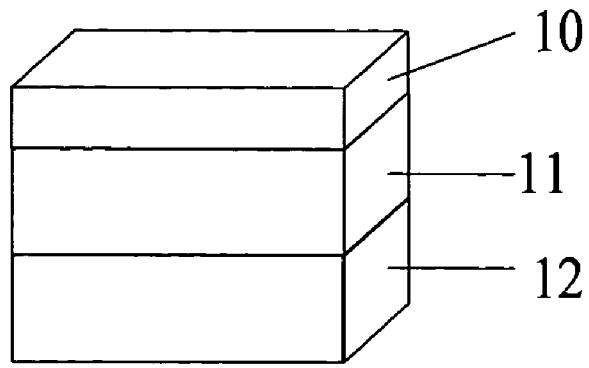
FIGS. 1A to 1F are views illustrating first example of the production process of a carbon nanotube composite material (magnetic material) according to the present invention.

Carbon Nanotube, Magnetic Material and Production Thereof

The methods for producing a carbon nanotube composite material and for producing a magnetic material according to the present invention comprise a nanohole structure forming process, a carbon nanotube forming process, and a continuous layer coating process, may preferably further comprising a metallic matrix layer removing process and/or a plasma treatment process and may further comprise one or more other processes according to necessity.

The method for producing a magnetic material of the present invention has the same configuration as the method for producing a carbon nanotube composite material of the present invention, except for using a magnetic metal to cover the inner surface of the carbon nanotube. Accordingly, these methods will be illustrated together in detail below.

The carbon nanotube composite material and the magnetic material of the present invention are suitably produced by the above-mentioned methods of the present invention, respectively. Accordingly, these materials will be illustrated together in detail below, with reference to the production methods thereof.

Nanohole Structure Forming Process

The nanohole structure forming process is a process for forming a metallic matrix layer and treating the metallic matrix layer to form plural nanoholes in the metallic matrix layer to thereby form the nanohole structure, which nanoholes extend in a direction substantially perpendicular to the plane of the metallic matrix layer.

The metallic matrix layer can comprise any suitable material and have any suitable shape, size and other properties. For example, the material can be any suitable material that can form nanoholes by the treatment and includes, for example, an elementary metal, or an oxide, nitride or alloy thereof, of which alumina (aluminum oxide) or aluminum is preferred.

The metallic matrix layer may be formed on a substrate. The substrate can comprise any suitable material and have any suitable shape, structure and size according to the purpose. The material includes, for example, a metal, glass, silicon, quartz and $SiO_2/Si$ comprising silicon coated with a thermally oxidized film. Each of these materials can be used alone or in combination. Among them, a metal is preferred, because it can be used as an electrode in anodization for forming the nanoholes. The substrate can be suitably produced or is available as a commercial product.

An electrode layer other than the substrate may be formed between the substrate and the metallic matrix layer when the nanoholes are formed by anodization.

The material of the electrode layer can be any suitable material according to the purpose and includes, for example, Nb, Ta, Ti, W, Cr, Co, Pt, Cu, Ir, Rh, and alloys thereof. Each of these materials can be used alone or in combination. The electrode layer can be formed according to any suitable procedure, such as vapor deposition or sputtering.

The thickness of the metallic matrix layer is not specifically limited, can be set according to the purpose, but is preferably 1 μm or less for yielding a carbon nanotube composite material comprising carbon nanotubes with a length of 1 μm or less. This is because the thickness of the metallic matrix layer regulates and is substantially equal to the length of the carbon nanotubes in the composite material and is suitably set according to a desired length of the carbon nanotubes. In other words, the length of the carbon nanotubes in the composite material can be easily control by the thickness of the metallic matrix layer, can have a sharp distribution of average length and can have uniform quality and physical properties.

The metallic matrix layer can be formed according to any suitable procedure, such as vapor deposition or sputtering. Among them, sputtering is preferred, because it can accurately and easily control the thickness of the metallic matrix layer.

The metallic matrix layer can be suitably formed by sputtering using a sputtering target comprising a metallic material for constituting the metallic matrix layer. The sputtering target can have any suitable purity according to the purpose, but preferably has a high purity. When the metallic material is aluminum, it preferably has a purity of 99.990% or more.

The nanoholes can be formed by any suitable treatment according to the purpose, as long as nanoholes are formed in the metallic matrix layer, for example, by anodization or etching.

Among such treatments, anodization is typically preferred for forming a multiplicity of nanoholes in the metallic matrix layer, which nanoholes extend in a direction substantially perpendicular to the plane of the substrate and are uniformly aligned at substantially constant intervals.

The anodization can be carried out under any suitable conditions including the type and concentration of an electrolyte, temperature and time period for anodization, and these conditions can be selected depending on the number, size and aspect ratio of the target nanoholes. The direction of current should coincide with the thickness direction of the metallic matrix layer. The electrolyte is preferably a diluted phosphoric acid solution, a diluted oxalic acid solution or a diluted sulfuric acid solution. The aspect ratio of the nanoholes can be controlled by immersing the anodized metallic matrix layer with a phosphate solution to thereby increase the diameter of the nanoholes such as alumina pores suitably.

When the nanohole structure is formed by anodization, a barrier layer may be formed at the bottom of the nanoholes in some cases. The barrier layer can be easily removed according to a conventional etching procedure using a conventional etchant such as phosphoric acid.

The resulting nanoholes formed in the metallic matrix layer by anodization may be arranged at random in its array and alignment, but these factors can be controlled, for example, by the following technique. Specifically, the nanoholes aligned regularly can be efficiently formed by forming rows of concave portions on the metallic matrix layer before anodization and then carrying out anodization to thereby form the nanoholes only on or along the rows of concave portions.

As a result of the nanohole structure forming process, a plurality of the nanoholes are formed in the metallic matrix layer and extend in a thickness direction of the metallic matrix layer.

The nanoholes in the nanohole structure are not specifically limited and may be through holes penetrating the nanohole structure or be pits or concave portions not penetrating the nanohole structure. The nanoholes are preferably through holes penetrating the nanohole structure.

The depth of the nanoholes can be any suitable depth according to the purpose, is generally 10 μm or less, but is preferably 1 μm or less. This is because the depth of the nanoholes corresponds to the length of the resulting carbon nanotube composite material or magnetic material.

The diameter of opening of nanoholes can be any suitable one according to the purpose, but is preferably 200 nm or less and more preferably 100 nm or less for producing the magnetic material of the present invention.

If the nanoholes have openings with a diameter exceeding 200 nm, the resulting carbon nanotube composite material or magnetic material may have an excessively large diameter and may not be suitably used as, for example, a magnetic powder having a single domain structure.

The nanoholes can have any suitable aspect ratio, i.e., a ratio of the depth to the diameter of opening. A high aspect ratio is desirable for higher anisotropy in dimensions, for higher dimensional effects of the carbon nanotube composite material and for higher coercive force of the magnetic material. The aspect ratio is preferably 2 or more and more preferably 5 or more.

An aspect ratio less than 2 may invite insufficient dimensional effects of the carbon nanotube composite material or insufficient coercive force of the magnetic material.

Carbon Nanotube Forming Process

The carbon nanotube forming process is a process for forming carbon nanotubes inside the nanoholes.

The carbon nanotubes can be formed according to any suitable procedure, such as chemical vapor deposition (CVD).

Examples of the chemical vapor deposition (CVD) procedure are thermal CVD (also merely referred to as "CVD"), hot filament CVD, plasma-enhanced CVD (also referred to as "plasma-assisted CVD or plasma CVD), plasma-enhanced hot filament CVD and laser-enhanced CVD (also referred to as "laser CVD"). Among them, thermal CVD and plasma CVD are preferred.

According to the thermal CVD, the material gas is decomposed by the action of a filament heated to about 400° C. to 2000° C. to thereby deposit carbon.

According to the plasma CVD, the material gas is decomposed by the action of plasma excited by high-frequency wave (RF) at about 0.1 to 1000 $W/cm^3$ to thereby deposit carbon. Instead of plasma excited by high-frequency wave (RF), plasma excited by, for example, low-frequency waves, microwaves (MW) or direct current (DC) can also be used.

The conditions for the formation of the carbon nanotubes by CVD are not specifically limited and can be suitably selected according to the purpose. For example, it is preferred that the flow rate of the material gas is controlled, and a gaseous mixture comprising a carbon-source gas and a carrier gas is used as the material gas.

Examples of the carbon-source gas are methane, ethylene, propylene, acetylene, benzene, butane, methanol, ethanol, propanol, isopropanol, $C_{10}H_{16}$, $CS_2$, and $C_{60}$ gases. Examples of the carrier gas are nitrogen, argon, hydrogen and $NH_3$ gases.

The mixing ratio of the gaseous mixture is not specifically limited and can be set according to the purpose. For example, in the case of propylene gas as the carbon-source gas and nitrogen gas as the carrier gas, the gaseous mixture is preferably fed at a ratio of the flow rate of propylene gas to that of nitrogen gas of from about 1:99 to 5:95 and a total flow rate of 100 to 300 $cm^3/min$. The temperature herein is preferably 700° C. to 900° C. and more preferably around 800° C.

When the carbon nanotubes are formed, for example, by CVD in the carbon nanotube forming process, the material for the metallic matrix layer serves as a catalyst for forming the carbon nanotubes, and an extra catalyst is not required. For example, when the metallic matrix layer is formed from aluminum, the aluminum at the exposed surface of the metallic matrix layer serves as a catalyst for forming the carbon nanotubes.

A catalyst for forming the carbon nanotubes may be arranged on the exposed surface of the metallic matrix layer or on the inner surfaces of the formed nanoholes by, for example, coating or vapor deposition.

The catalyst can be any suitable catalyst according to the purpose and is preferably a transition metal catalyst. Examples of the transition metal are Fe, Ni, Co, Ru, Rh, Pd, Pt, La, Ce, Pr, Nd, Gd, Tb, Dy, Ho, Er, Lu, and alloys of these metal elements.

The exposed surface of the metallic matrix layer may be cleansed before the carbon nanotube forming process.

Examples of cleaning procedure are washing with a solvent, corona treatment, plasma treatment, plasma ashing or another discharge treatment.

The carbon nanotubes formed by the carbon nanotube forming process are substantially uniform in their diameter, length and number of layers. When the thickness of the metallic matrix layer is set at 1 μm or less, the average length of the carbon nanotubes is 1 μm or less and they are closed at one end.

Continuous Layer Coating Process

The continuous layer coating process is a process for coating or covering the inner surfaces of the carbon nanotubes formed in the carbon nanotube forming process with a continuous layer of a metal for producing the carbon nanotube composite material or with a continuous layer of a magnetic metal for producing the magnetic material.

The continuous layer can be formed, for example, by electrodeposition, nonelectrolytic plating, vapor deposition, sputtering or electrodeposition, of which electrodeposition or nonelectrolytic plating is preferred, and electrodeposition is typically preferred.

The electrodeposition can be carried out under any suitable conditions according to the purpose. More specifically, the electrodeposition can be carried out, for example, in the following manner. The nanohole structure comprising the carbon nanotubes in the nanoholes is immersed in a solution or a solution mixture containing a metal for producing the carbon nanotube composite material or containing a magnetic metal for producing the magnetic material, and a voltage is applied using the electrode layer as an electrode to thereby precipitate or deposit the metal or the magnetic metal on the inner surfaces of the carbon nanotubes.

In the electrodeposition, defoaming in vacuo is preferably carried out while the nanohole structure is immersed in the solution containing the metal or magnetic metal. Thus, the entire inner surfaces of the carbon nanotubes can come into contact with the solution. The defoaming in vacuo can be carried out under any suitable conditions according to the purpose.

Thus, the inner surfaces of the carbon nanotubes are coated with the continuous layer of the metal or magnetic metal. The metal can be any suitable metal according to the purpose, such as an elementary metal or an alloy. When the carbon nanotube composite material is used as an electronic or electric material, the metal preferably has high electroconductivity. When used as a magnetic material, the metal is preferably a magnetic metal.

The magnetic metal is not specifically limited, can be suitably selected according to the purpose and may be a ferromagnetic material or a soft magnetic material.

Examples of the ferromagnetic material are those containing Fe, Co, Ni, FeCo, FeNi, CoNi, CoNiP, FePt, CoPt, NiPt, or other elements.

The soft magnetic material can be any suitable one according to the purpose, such as one containing FeCo, NiFe, FeSiAl, FeC, FeCoB, FeCoNiB, CoZrNb, or other elements.

Each of these magnetic metals can be used alone or in combination. Among them, permalloy (NiFe, Fe:Ni=20:80) is preferred.

The inner surfaces of the carbon nanotubes are coated with the continuous layer of the metal or magnetic metal as a result of the continuous layer coating process. Whether the inner surfaces of the carbon nanotubes are coated with the continuous layer or not can be determined, for example, by electron diffraction analysis. When the inner surfaces of the carbon nanotubes are coated with the continuous layer, a diffraction pattern showing good crystallinity will be obtained. In contrast, when the inner surfaces of the carbon nanotubes are coated not with the continuous layer but with a discontinuous layer, a diffraction pattern showing insufficient crystallinity will be obtained.

Plasma Treatment Process

The plasma treatment process is a process for carrying out etching with the use of plasma. Thus, the carbon layer deposited on the surface of the nanohole structure (the metallic matrix layer) can be removed, and the hydrophilicity of the surface of the carbon nanotube can be improved.

The plasma treatment process is preferably carried out before or after the continuous layer coating process and more preferably carried out before the continuous layer coating process.

By carrying out the plasma treatment process before the continuous layer coating process, the inner surfaces of the nanoholes such as alumina nanoholes in the nanohole structure (the metallic matrix layer) are hydrophilized to have improved wettability (hydrophilicity) with the liquid containing the metal or magnetic metal, such as a plating solution, used in the continuous layer coating process and to have a varied surface resistance. Thus, the liquid easily penetrate into the nanoholes, and the inner surfaces of the nanoholes are efficiently and sufficiently covered with the continuous film of the metal or magnetic metal at a high filling ratio.

In addition, the carbon layer deposited on the metallic matrix layer (the nanohole structure) in the carbon nanotube forming process is removed by the plasma treatment, and the carbon nanotube composite material or the magnetic material can be independently or separately obtained as a result of the metallic matrix layer removing process.

The plasma treatment can be carried out under any suitable conditions according to the purpose.

Metallic Matrix Layer Removing Process

The metallic matrix layer removing process is a process for fusing or dissolving and thereby removing the metallic matrix layer. Thus, the carbon nanotube composite material or magnetic material of the present invention is produced. When the plasma treatment is not carried out, the resulting carbon nanotube composite material or magnetic material has a bundle or bed-of-nails shape and comprises the carbon layer which has been deposited on the metallic matrix layer (the nanohole structure) to be removed and a multiplicity of the carbon nanotube composite materials or the magnetic materials arranged integrally with the carbon layer. In this product, the carbon nanotube composite materials or the magnetic materials are aligned in a direction substantially perpendicular to the layer plane of the carbon nanotube.

The metallic matrix layer removing process can be carried out under any suitable conditions according to any suitable procedure. For example, the metallic matrix layer is preferably fused and removed by immersing in hydrogen fluoride (HF) or hydrothermal treatment with sodium hydroxide (NaOH).

Other Processes

The other processes are not specifically limited, can be selected according to the purpose and include, for example, a washing or cleaning process and a drying process.

According to the above-mentioned methods of the present invention, the carbon nanotube composite structure and magnetic material of the present invention can be efficiently produced, respectively.

The carbon nanotube composite material or magnetic material comprises the carbon nanotube and the continuous layer of the metal or magnetic metal covering the inner surface of the carbon nanotube.

The carbon nanotube composite material has inner surfaces of the carbon nanotubes covered by the continuous layer of the metal, thereby has uniform properties derived from the metal. In addition, it has a high filling ratio of the metal, exhibits excellent physical properties derived from the magnetic metal at high levels and is of high quality.

The magnetic material has inner surfaces of the carbon nanotubes covered by the continuous layer of a magnetic metal, thereby has uniform magnetic properties derived from the magnetic metal. In addition, it has a high filling ratio of the magnetic metal, exhibits excellent magnetic properties derived from the magnetic metal at high levels and is of high quality. The magnetic material has a surface comprising carbon nanotube and is thereby easily chemically modified. Thus, it has more excellent wettability and dispersibility with other materials such as polymer binders, has more satisfactory coatability and handleability than conventional inorganic magnetic powders and can be suitably used, for example, in high-quality magnetic disks and magnetic tapes.

In the carbon nanotube composite material or magnetic material, the continuous layer covers the surfaces of the carbon nanotubes, and the filling ratio of the metal or the magnetic metal is substantially 100%.

The filling ratio of the metal or magnetic metal can be determined, for example, by electron diffraction analysis. In this case, the resulting diffraction pattern shows higher crystallinity with an increasing filling ratio of the metal or magnetic metal.

The length of the carbon nanotube composite material or magnetic material can coincide with the thickness of the metallic matrix layer, and thereby a carbon nanotube composite material or magnetic material having such a short length of 1 μm or less can be easily produced. The length of the carbon nanotube coincides with the thickness of the metallic matrix layer such as aluminum layer or alumina layer and can be accurately, uniformly and easily controlled to a desired length by controlling the thickness of the metallic matrix layer.

The carbon nanotube in the carbon nanotube composite material or the magnetic material is closed at its one end, and the carbon nanotube composite material or the magnetic material is chemically highly stable and is resistant to oxidation with time. It can therefore be suitably used in various applications.

When the plasma treatment is not carried out, the resulting carbon nanotube composite material or magnetic material has a bundle or bed-of-nails shape and comprises the carbon layer deposited on the metallic matrix layer (the nanohole structure) to be removed and a multiplicity of the carbon nanotube composite materials or the magnetic materials arranged integrally with the carbon layer. In this product, the carbon nanotube composite materials or the magnetic materials are aligned and each extend in a direction substantially perpendicular to the layer plane of the carbon nanotube.

The carbon nanotube composite material or magnetic material has both properties derived from the carbon nanotube and properties derived from the metal or magnetic metal. In addition, the outside carbon nanotube works to improve the chemical stability of the inside metal or magnetic metal and is easily chemically modified. Thus, it can be easily configured according to the purpose and is easily handled. The chemical modification is carried out, for example, by combining a biomolecule such as antibody to the surface of the carbon nanotube. In this case, the resulting carbon nanotube composite material is applicable to separation and purification technologies, and drug delivery systems.

The carbon nanotube composite material can be suitably used in various fields such as electric and electronic materials, magnetic materials, carriers in drug delivery systems, electroconductive materials and antistatic materials. More specifically, it can be suitably used, for example, in various fields including electronic materials such as field emission displays and fluorescent indicator lamps, energy materials such as fuel cells and lithium ion cells, composite materials such as reinforced plastics and antistatic materials, nanotechnology materials such as nanodevices, probes for scanning probe microscopes and DNA chips.

The magnetic material can be suitably used in magnetic recording media such as magnetic disks and magnetic tapes. It can typically suitably used in magnetic disks widely used as external storage for computers and consumer-oriented video recorders, as well as magnetic tapes such as video tapes and cassette tapes. It can also be suitably used in separation and purification technologies, and drug delivery systems utilizing magnetism.

The present invention will be illustrated in further detail with reference to several examples below, which are not intended to limit the scope of the present invention. In the following examples, carbon nanotube composite materials according to the present invention were produced by the method of the present invention. In these examples, the metal to be contained in the carbon nanotube composite material is the magnetic metal. Thus, the method for producing a carbon nanotube composite material corresponds to the method for producing a magnetic material of the present invention, and the carbon nanotube composite material corresponds to the magnetic material of the present invention.

EXAMPLE 1

Figure 1B:
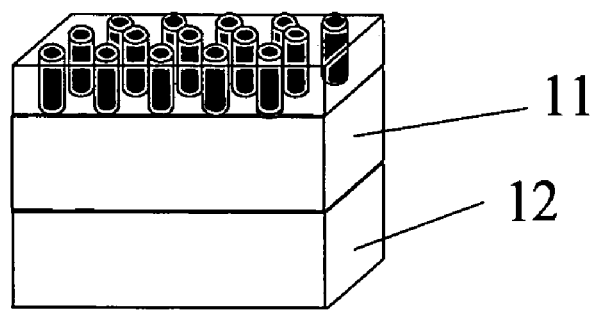

With reference to FIGS. 1A to 1F, initially, a layer 11 of Nb as the electrode layer 250 nm thick was deposited on a silicon wafer 12 in vacuo by sputtering. Then a layer 10 of aluminum (Al) as the metallic matrix layer was deposited thereon in vacuo by sputtering using an aluminum sputtering target (FIG. 1A). The resulting metallic matrix layer was anodized in a 20% by weight sulfuric acid solution at 20° C. at a voltage of 10 V to thereby form the nanohole structure having a multiplicity of nanoholes (alumina nanoholes, alumina pores) as through-holes extending in a direction substantially perpendicular to the plane of the metallic matrix layer (FIG. 1B). This process is the nanohole structure forming process.

The metallic matrix layer has a thickness (depth or length of the nanoholes) of 300 nm, and the nanoholes each have an opening with a diameter of 15 nm.

Next, carbon was allowed to grow on the outer surface of the nanohole structure (alumina nanohole) and the inner surfaces of the nanoholes by CVD using propylene gas and nitrogen gas as the carbon-source gas and carrier gas, respectively, for the formation of carbon nanotubes. More specifically, the substrate (silicon wafer) carrying the nanoholes was placed in a quartz tubular reactor and was raised in temperature to 800° C. in nitrogen atmosphere over 2 hours. Then, a 1.2% gaseous mixture of propylene gas in nitrogen gas as the carrier gas was fed into the tubular reactor, followed by carrying out CVD at 800° C. for 2 hours. The feeding of propylene gas was then stopped, and the reactor was cooled to room temperature in nitrogen atmosphere.

Figure 1C:
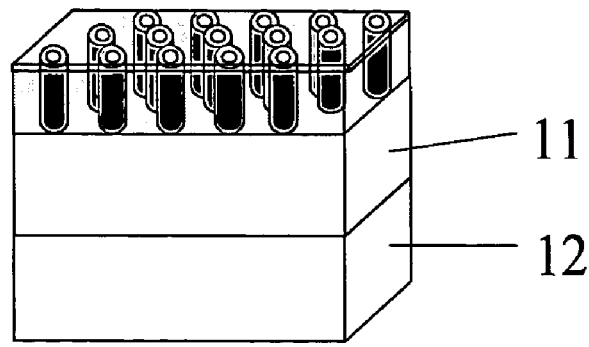

Thus, a carbon layer was formed on the surface of the nanohole structure, and the carbon nanotubes were formed inside the nanoholes in the nanohole structure (FIG. 1C). This process is the carbon nanotube forming process.

Figure 1D:
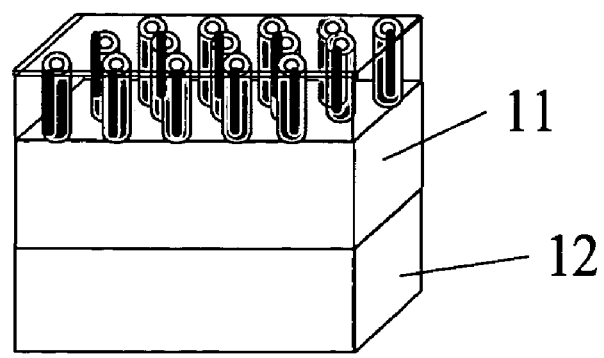

The nanohole structure comprising the carbon layer on its surface and the carbon nanotubes inside the nanoholes was immersed in a plating solution for permalloy (Fe:Ni=20:80) containing iron sulfate, nickel sulfate, boric acid and additives. Simultaneously, vacuum defoaming at a pressure of 5 mTorr (0.67 Pa) or less was carried out to allow the plating solution to penetrate into the carbon nanotubes satisfactorily. Then, the metal (permalloy) was plated by electrodeposition under a plating condition at 30° C. to 37° C. to thereby form a continuous film of the permalloy on the inner surfaces of the carbon nanotubes (FIG. 1D). This process is the continuous layer coating process.

Figure 1E:
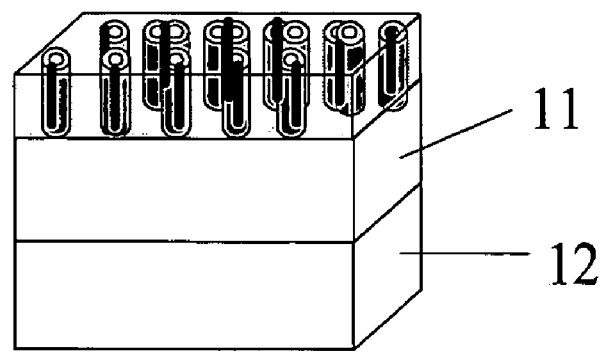
Figure 1F:
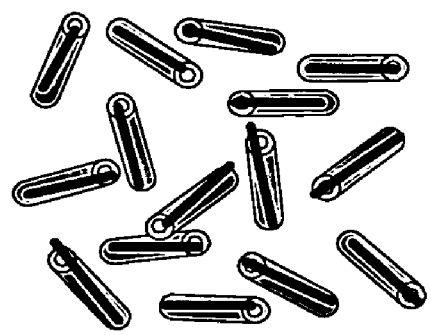

Next, the nanohole structure after the continuous layer coating process was subjected to plasma treatment at a pressure of 10 Pa, an oxygen flow rate of 30 ml/min and a power of 100 W to thereby remove the carbon layer deposited on the surface (FIG. 1E). This process is the plasma treatment process.

The nanohole structure after the plasma treatment process was further subjected to hydrothermal treatment with 10 M NaOH at 150° C. in an autoclave to thereby fuse and remove the metallic matrix layer (aluminum layer). This process is the metallic matrix layer removing process.

Figure 4:
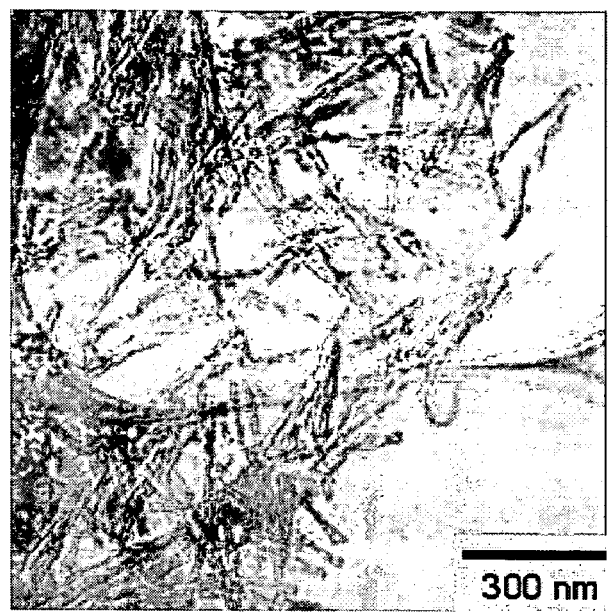
FIGS. 4, 5, 6, and 7 are transmission electron micrographs of the carbon nanotube composite material (magnetic material) of the present invention produced by the method of the present invention.
Figure 5:
Figure 6:
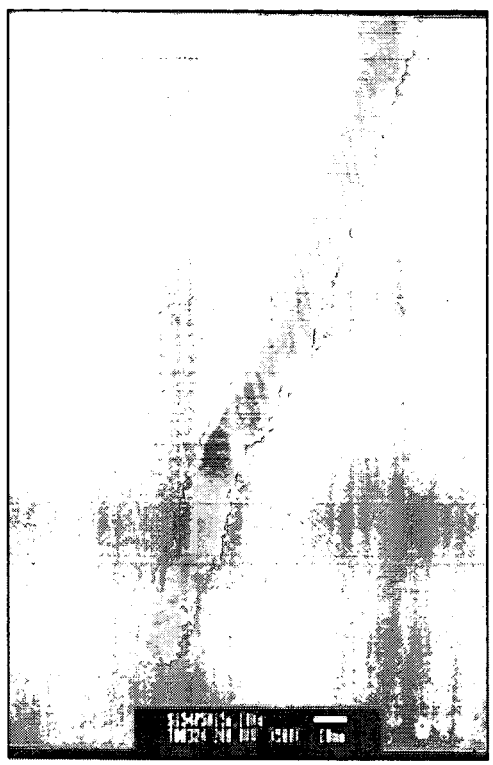
Figure 7:
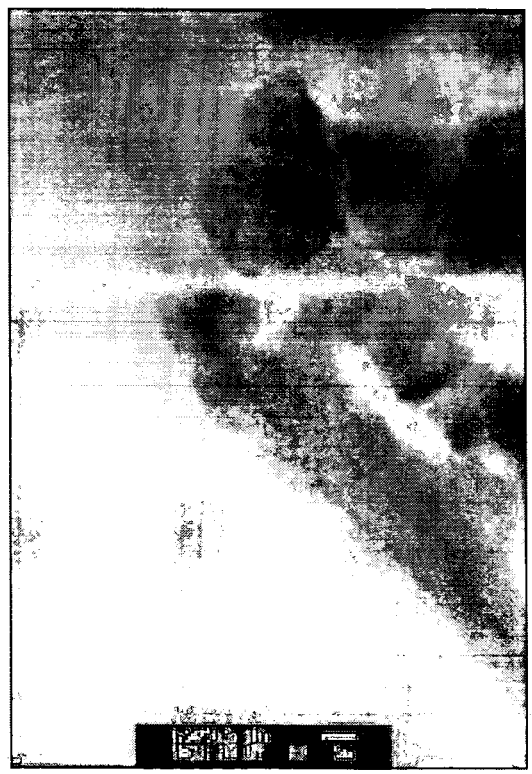
Figure 8:
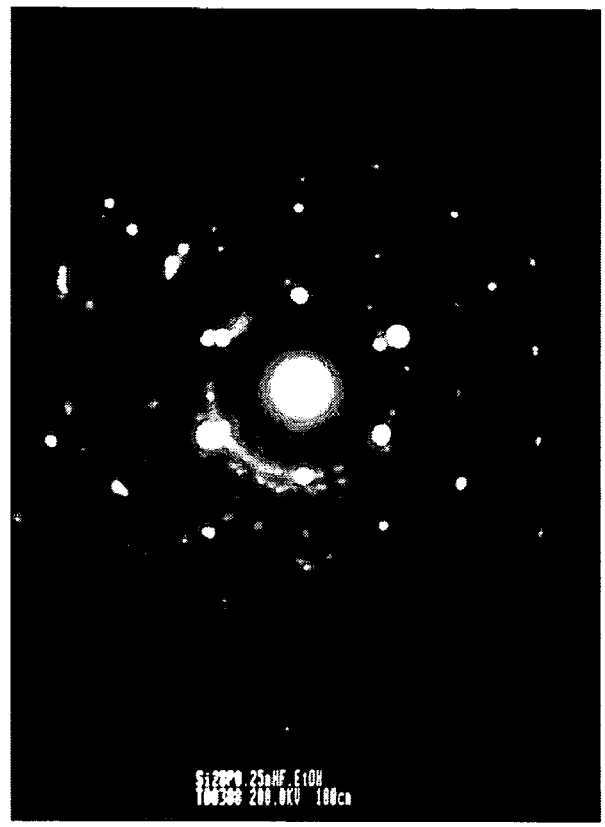
FIG. 8 is an electron diffraction pattern of the carbon nanotube composite material (magnetic material) of the present invention produced by the method of the present invention.

As a result, a multiplicity of carbon nanotube composite materials (magnetic materials) of the present invention having an average length of 300 nm, an average outer diameter of 15 nm and comprising the continuous layer of permalloy covering the inner surfaces was obtained (FIG. 1F), as shown in transmission electron micrographs of FIGS. 4, 5, 6 and 7. FIG. 5 is a partial enlarged view of FIG. 4, and FIGS. 6 and 7 are each a partial enlarged view of FIG. 5. These figures show that the continuous layer of permalloy covers the inner surfaces of the carbon nanotubes and appears somewhat black. In addition, the electron diffraction pattern of FIG. 8 shows that the continuous layer of permalloy works as a metal layer having good crystallinity and covers the inner surfaces of the carbon nanotubes.

Figure 9:
FIGS. 9, 10 and 11 are photographs of an experiment for verifying the magnetic properties of the carbon nanotube composite material (magnetic material) of the present invention.
Figure 10:
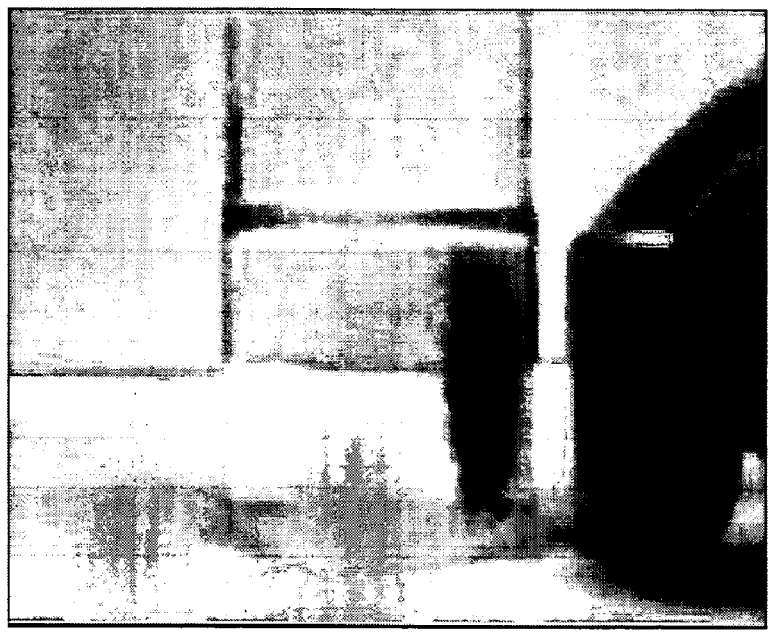
Figure 11:

To verify its magnetic properties, the above-produced carbon nanotube composite materials (magnetic materials) were dispersed in a mixture of water and ethanol in a test tube, and a permanent magnet was brought close to the test tube. The carbon nanotubes (magnetic materials) including the permalloy were attracted by the permanent magnet (FIG. 9) and gathered as a mass of black powder in the vicinity of the tube wall adjacent to the permanent magnet (FIG. 10). The permalloy used herein is a soft magnetic material and has little residual magnetization. Thus, when the permanent magnet was brought away from the test tube, the mass of the carbon nanotube composite materials (magnetic materials) fell to pieces and precipitated at the bottom of the test tube (FIG. 11). FIG. 11 is a photograph taken immediately after the permanent magnet was brought away from the test tube.

The saturation magnetization of the carbon nanotube composite material (magnetic material) was determined using a vibration-sample type magnetometer (VSM) and was found to be 65 emu/g ($81.7 \times 10^{-7}$ wb/g).

These results verify that the carbon nanotube composite material (magnetic material) has magnetic properties, indicating that it can be used as a magnetic material and is applicable to carriers in drug delivery systems and separation and purification technologies utilizing magnetism.

EXAMPLE 2

Figure 2A:
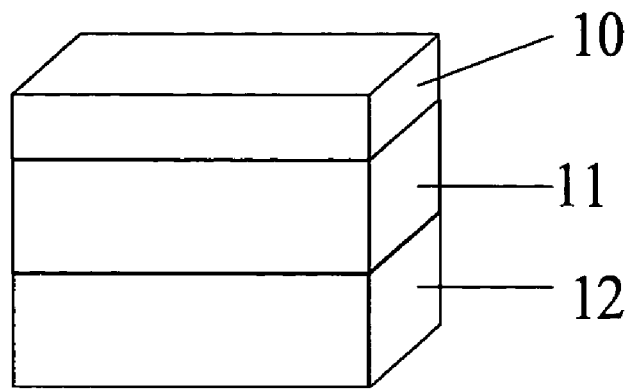
FIGS. 2A to 2E are views illustrating second example of the production process of a carbon nanotube composite material (magnetic material) according to the present invention.
Figure 2B:
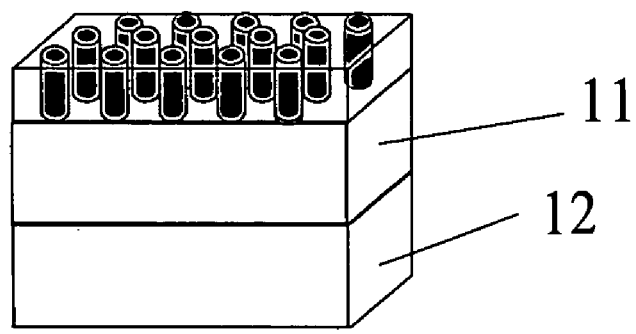

A series of carbon nanotube composite materials (magnetic materials) were produced by the procedure of Example 1, except that the thickness of the metallic matrix layer was changed to 1000 nm, 500 nm, 300 nm and 50 nm, respectively, and that the plasma treatment was not carried out (FIGS. 2A to 2E). Specifically, a layer 11 of Nb as the electrode layer 250 nm thick was deposited on a silicon wafer 12 in vacuo by sputtering. Then a layer 10 of aluminum (Al) as the metallic matrix layer was deposited thereon in vacuo by sputtering using an aluminum sputtering target (FIG. 2A). The resulting metallic matrix layer was anodized in a 20% by weight sulfuric acid solution at 20° C. at a voltage of 10 V to thereby form the nanohole structure having a multiplicity of nanoholes (alumina nanoholes, alumina pores) as through-holes extending in a direction substantially perpendicular to the plane of the metallic matrix layer (FIG. 2B). Next, carbon was allowed to grow on the outer surface of the nanohole structure (alumina nanohole) and the inner surfaces of the nanoholes by CVD using propylene gas and nitrogen gas as the carbon-source gas and carrier gas, respectively, for the formation of carbon nanotubes. More specifically, the substrate (silicon wafer) carrying the nanoholes was placed in a quartz tubular reactor and was raised in temperature to 800° C. in nitrogen atmosphere over 2 hours. Then, a 1.2% gaseous mixture of propylene gas in nitrogen gas as the carrier gas was fed into the tubular reactor, followed by carrying out CVD at 800° C. for 2 hours. The feeding of propylene gas was then stopped, and the reactor was cooled to room temperature in nitrogen atmosphere.

Figure 2C:
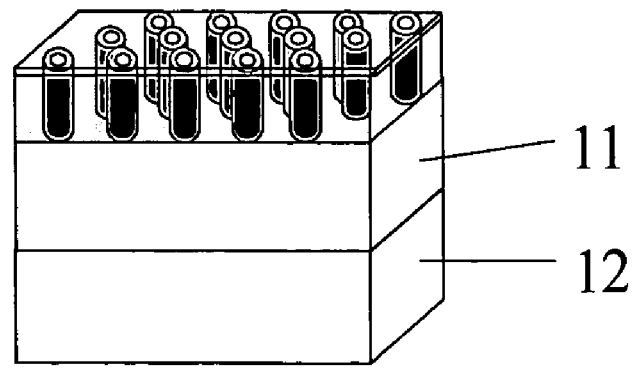
Figure 2D:
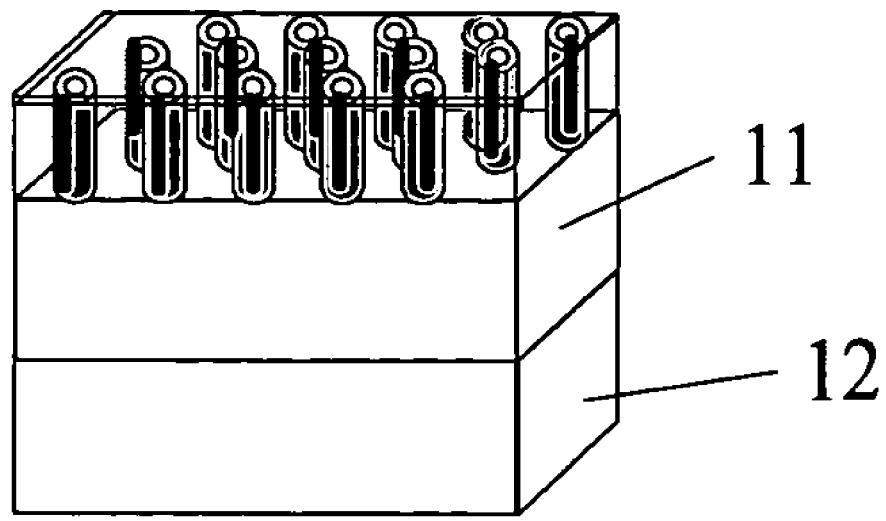
Figure 2E:
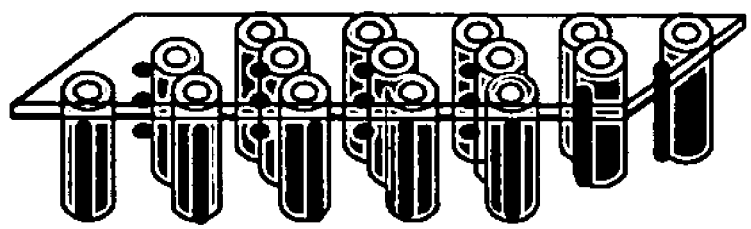
Figure 12:
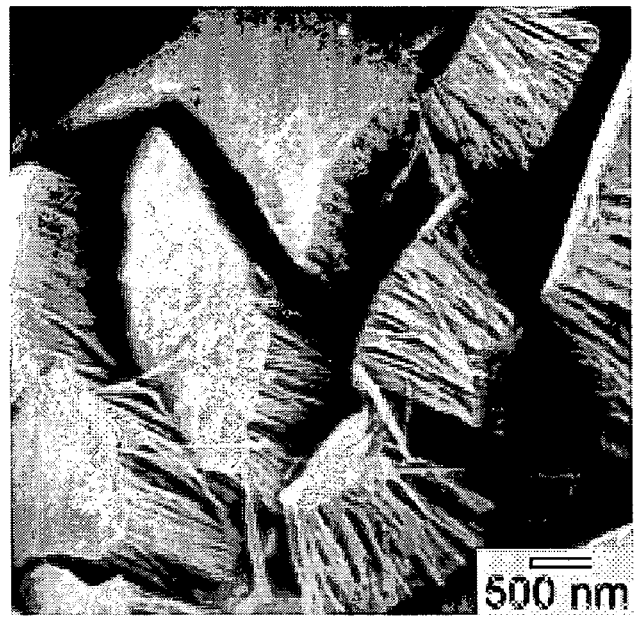
FIGS. 12, 13, 14 and 15 are transmission electron micrographs of bed-of-nails carbon nanotube composite materials (magnetic materials) of the present invention produced by the method of the present invention.
Figure 13:
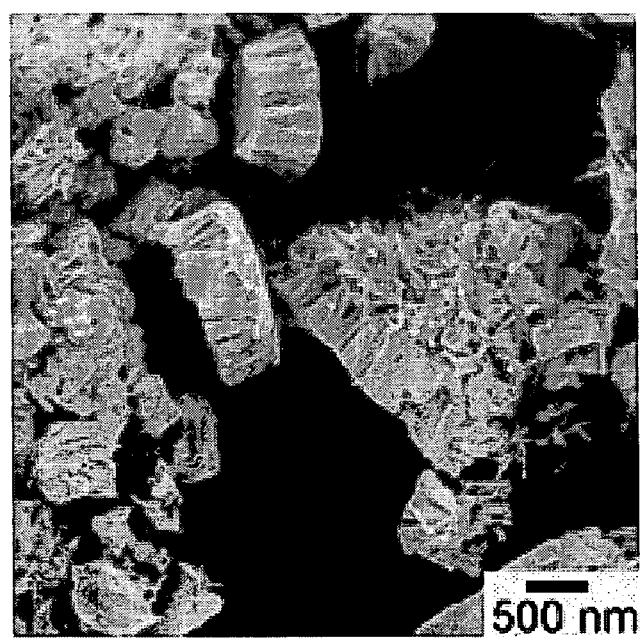
Figure 14:
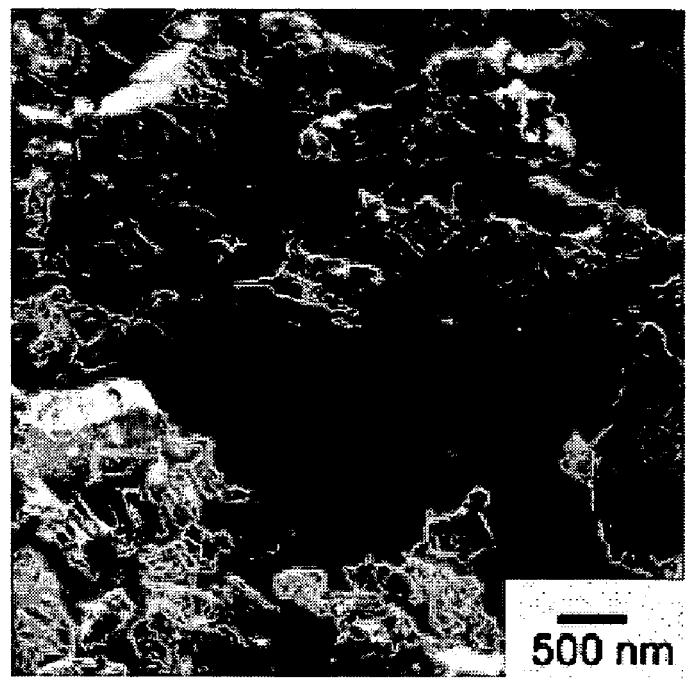
Figure 15:
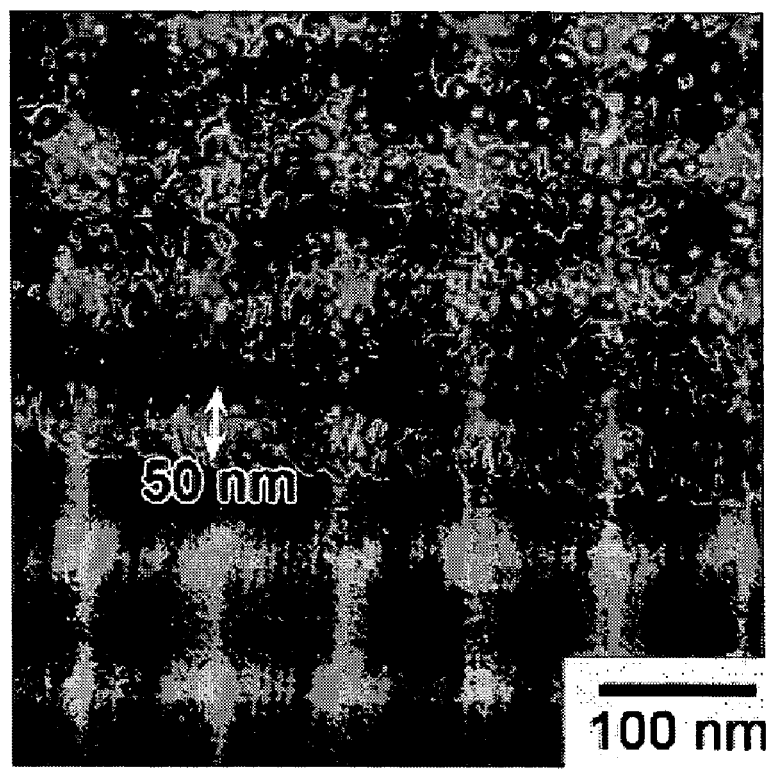

Thus, a carbon layer was formed on the surface of the nanohole structure, and the carbon nanotubes were formed inside the nanoholes in the nanohole structure (FIG. 2C). The nanohole structure comprising the carbon layer on its surface and the carbon nanotubes inside the nanoholes was immersed in a plating solution for permalloy (Fe:Ni=20:80) containing iron sulfate, nickel sulfate, boric acid and additives. Simultaneously, vacuum defoaming at a pressure of 5 mTorr (0.67 Pa) or less was carried out to allow the plating solution to penetrate into the carbon nanotubes satisfactorily. Then, the metal (permalloy) was plated by electrodeposition under a plating condition at 30° C. to 37° C. to thereby form a continuous film of the permalloy on the inner surfaces of the carbon nanotubes (FIG. 2D). The nanohole structure was further subjected to hydrothermal treatment with 10 M NaOH at 150° C. in an autoclave to thereby fuse and remove the metallic matrix layer (aluminum layer). As a result, bed-of-nails carbon nanotube composite materials (magnetic materials) were obtained (FIG. 2E). These materials each comprises a multiplicity of the carbon nanotube composite materials (magnetic materials) integrated with the carbon layer and extending in a direction substantially perpendicular to the plane of the carbon layer as shown in FIG. 12 (at a thickness of the metallic matrix layer of 1000 nm), FIG. 13 (at a thickness of 500 nm), FIG. 14 (at a thickness of 300 nm) and FIG. 15 (at a thickness of 50 nm).

EXAMPLE 3

Figure 3A:
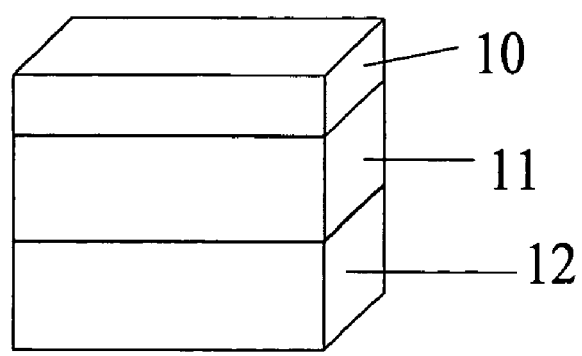
FIGS. 3A to 3F are views illustrating third example of the production process of a carbon nanotube composite material (magnetic material) according to the present invention.
Figure 3B:
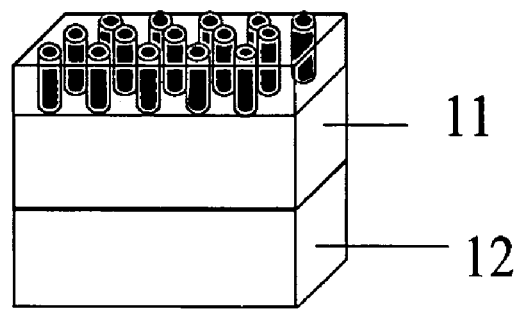

Carbon nanotube composite materials (magnetic materials) were produced by the procedure of Example 1, except that the plasma treatment was carried out before the continuous layer coating process (FIGS. 3A to 3E). Specifically, a layer 11 of Nb as the electrode layer 250 nm thick was deposited on a silicon wafer 12 in vacuo by sputtering. Then a layer 10 of aluminum (Al) as the metallic matrix layer was deposited thereon in vacuo by sputtering using an aluminum sputtering target (FIG. 3A). The resulting metallic matrix layer was anodized in a 20% by weight sulfuric acid solution at 20° C. at a voltage of 10 V to thereby form the nanohole structure having a multiplicity of nanoholes (alumina nanoholes, alumina pores) as through-holes extending in a direction substantially perpendicular to the plane of the metallic matrix layer (FIG. 3B). Next, carbon was allowed to grow on the outer surface of the nanohole structure (alumina nanohole) and the inner surfaces of the nanoholes by CVD using propylene gas and nitrogen gas as the carbon-source gas and carrier gas, respectively, for the formation of carbon nanotubes. More specifically, the substrate (silicon wafer) carrying the nanoholes was placed in a quartz tubular reactor and was raised in temperature to 800° C. in nitrogen atmosphere over 2 hours. Then, a 1.2% gaseous mixture of propylene gas in nitrogen gas as the carrier gas was fed into the tubular reactor, followed by carrying out CVD at 800° C. for 2 hours. The feeding of propylene gas was then stopped, and the reactor was cooled to room temperature in nitrogen atmosphere.

Figure 3C:
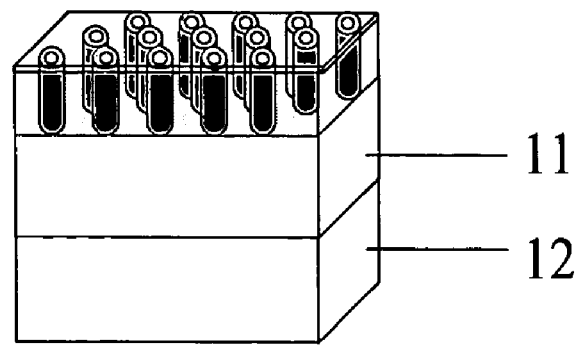
Figure 3D:
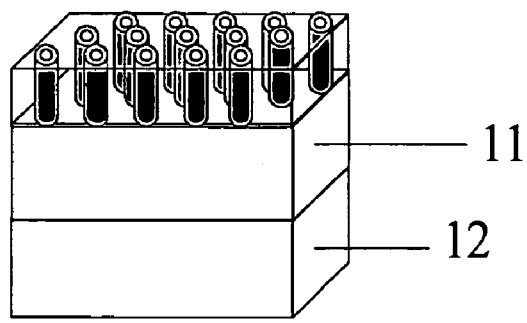

Thus, a carbon layer was formed on the surface of the nanohole structure, and the carbon nanotubes were formed inside the nanoholes in the nanohole structure (FIG. 3C). Next, the nanohole structure was subjected to plasma treatment at a pressure of 10 Pa, an oxygen flow rate of 30 ml/min and a power of 100 W to thereby remove the carbon layer deposited on the surface (FIG. 3D).

Figure 3E:
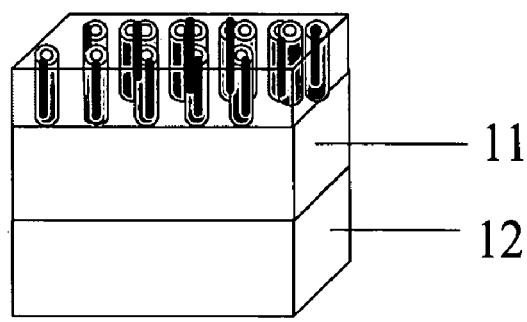
Figure 3F:
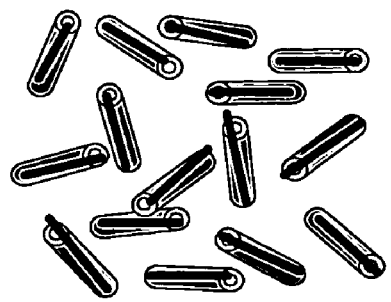

The nanohole structure was immersed in a plating solution for permalloy (Fe:Ni=20:80) containing iron sulfate, nickel sulfate, boric acid and additives. Simultaneously, vacuum defoaming at a pressure of 5 mTorr (0.67 Pa) or less was carried out to allow the plating solution to penetrate into the carbon nanotubes satisfactorily. Then, the metal (permalloy) was plated by electrodeposition under a plating condition at 30° C. to 37° C. to thereby form a continuous film of the permalloy on the inner surfaces of the carbon nanotubes (FIG. 3E). The nanohole structure was further subjected to hydrothermal treatment with 10 M NaOH at 150° C. in an autoclave to thereby fuse and remove the metallic matrix layer (aluminum layer). As a result, a multiplicity of carbon nanotube composite materials (magnetic materials) according to the present invention having an average length of 300 nm and an average outer diameter of 15 nm and including permalloy (the inner surface was covered by the continuous layer of permalloy) was produced (FIG. 3F) as in Example 1 shown in the transmission electron micrographs of FIGS. 4 to 7.

According to Example 3, the plasma treatment was carried out before the continuous layer coating process. The inner surfaces of the carbon nanotubes were thereby hydrophilized to have a decreased surface tension and an increased wettability with the plating solution. Thus, the inner surfaces of the carbon nanotubes could be efficiently covered with the continuous layer of permalloy in a short time with a filling ratio (inside coverage ratio) of about 100%.

Figure 16:
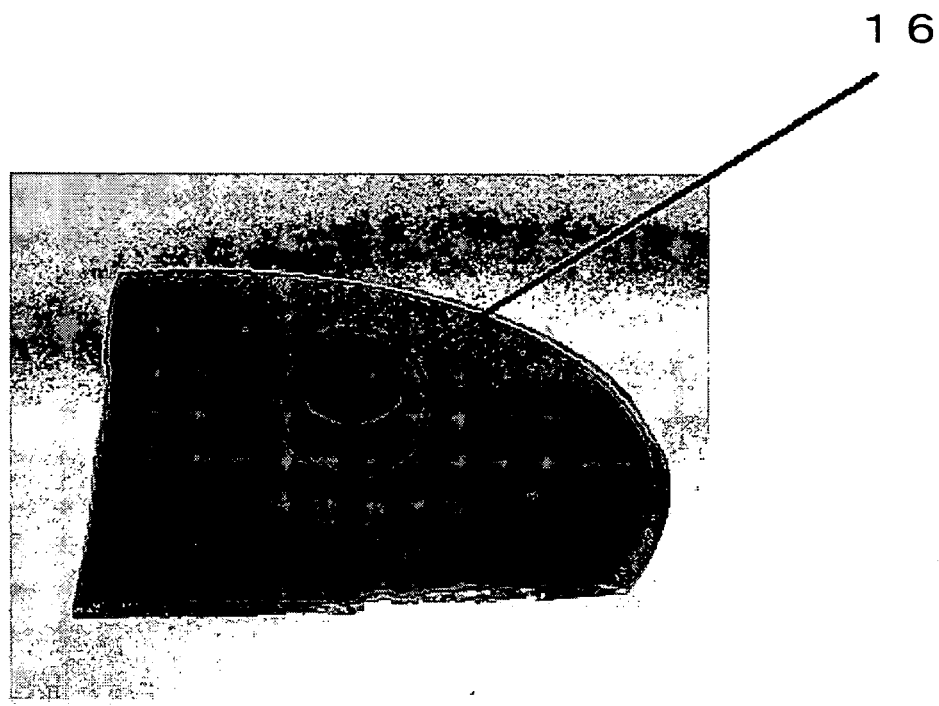
FIGS. 16 and 17 are photographs showing the wettability of the carbon surface layer of the carbon nanotube composite material before and after plasma treatment, respectively.
Figure 17:
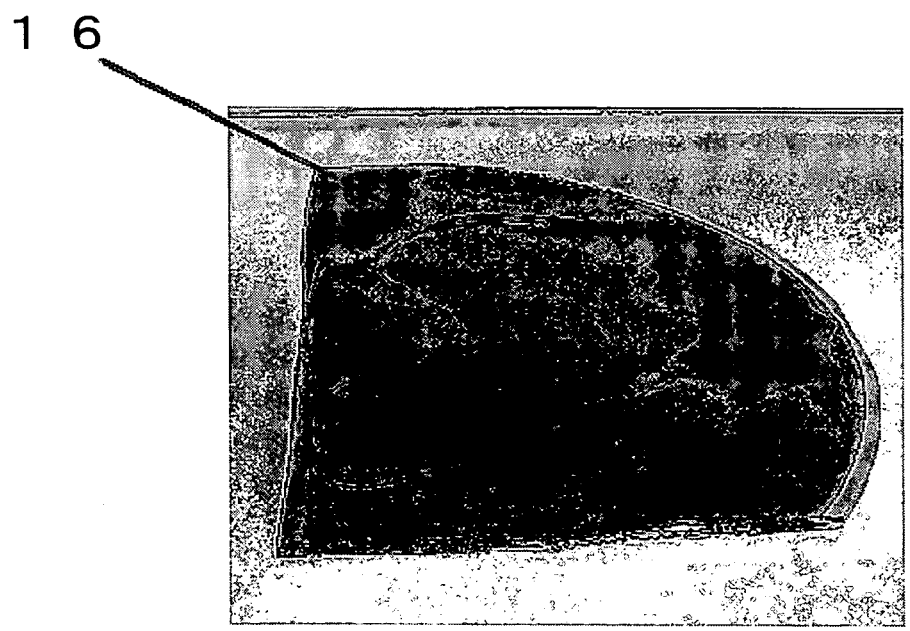

To determine how the hydrophilicity of the inner surfaces of the carbon nanotubes changes before and after the plasma treatment, the following test was performed. Specifically, a carbon layer was formed and subjected to the plasma treatment on its surface under the same conditions as Example 1. In this procedure a water droplet was placed on the carbon layer before and after the plasma treatment. In the case where the plasma treatment was not carried out, i.e., before the plasma treatment, the water droplet did not spread and maintained its droplet shape due to low hydrophilicity of the carbon layer (FIG. 16). In contrast, in the case where the plasma treatment was carried out, i.e., after the plasma treatment, the water droplet spread and did not maintain its droplet shape due to high hydrophilicity of the carbon layer.

COMPARATIVE EXAMPLE 1

A carbon tube including permalloy was produced by the method described in Japanese Patent (JP-B) No. 3402032. Specifically, a carbon tube was allowed to grow inside the pores in an anodized film (ANODISC, available from Whatman Paper) by CVD using polypropylene. The product was immersed in the plating solution used in the continuous layer coating process of Example 1 for 3 hours while defoaming in vacuo. Then, the article was taken out from the plating solution, was dried in a drier at 80° C. in nitrogen atmosphere for one day, was placed in a quartz tubular reactor, was reduced at 500° C. in hydrogen atmosphere, and was subjected to hydrothermal treatment with NaOH to remove the anodized film (alumina) by fusing to thereby yield the carbon tube including permalloy.

The saturation magnetization of the permalloy-containing carbon tube according to Comparative Example 1 was determined by the procedure of Example 1 and was found to be 25 emu/g ($31.4 \times 10^{-7}$ wb/g), lower than that in Example 1. The permalloy-containing carbon tube according to Comparative Example 1 has a multiplicity of positions not filled with the metal in the carbon nanotube, and a discontinuous layer of the permalloy covers the inner surface as shown in FIG. 2 of JP-B No. 3402032. Thus, the filling ratio of the permalloy is low and the carbon nanotube has a saturation magnetization lower than the carbon nanotube composite material (magnetic material) of Example 1 according to the present invention. The latter has a high filling ratio of the permalloy, and the continuous layer of permalloy covers the inner surface thereof.

These results show that carbon nanotube composite material (magnetic material) according to the present invention has a greater saturation magnetization and more excellent magnetic properties than permalloy-containing carbon tube of Comparative Example 1 and is very useful for magnetic recording materials and various technologies utilizing magnetism.

The carbon nanotube composite material of the present invention solves the problems in conventional technologies, has a well controlled short length of 1 μm or less, has excellent and uniform physical properties, is resistant to oxidation of the contained metal with time, is highly chemically stable, has good durability, is capable of using repetitively, has good handleability such as coatability, high wettability and dispersibility with other materials such as polymer binders, is easily chemically modified, is easily handled and can be suitably used in various fields such as electronic and electric materials, magnetic materials and carriers for drug delivery systems. The method of the present invention can efficiently produce the carbon nanotube composite material.

The novel magnetic material of the present invention solves the problems in conventional technologies, can be desirably controlled in its size to have a desirable short length and to have a nano-scale size enabling high-density recording, has a great magnetic anisotropy, avoids thermal fluctuation even in high-density recording, has excellent and uniform magnetic properties, is resistant to oxidation with time, is chemically stable, has good coatability, high wettability and dispersibility with other materials such as polymer binders, is easily chemically modified and is easily handled. The method of the present invention can efficiently produce the magnetic material.

The carbon nanotube composite material of the present invention can be suitably used in various fields such as electric and electronic materials, magnetic materials, carriers in drug delivery systems, electroconductive materials and antistatic materials. More specifically, it can be suitably used, for example, in various fields including electronic materials such as field emission displays and fluorescent indicator lamps, energy materials such as fuel cells and lithium ion cells, composite materials such as reinforced plastics and antistatic materials, nanotechnology materials such as nanodevices, probes for scanning probe microscopes and DNA chips.

The method for producing a carbon nanotube composite material of the present invention can be suitably used for producing the carbon nanotube composite material of the present invention.

The magnetic material of the present invention can be suitably used in magnetic recording media such as magnetic disks and magnetic tapes. It can typically suitably used in magnetic disks widely used as external storage for computers and consumer-oriented video recorders, as well as magnetic tapes such as video tapes and cassette tapes. It can also be suitably used in separation and purification technologies and drug delivery systems utilizing magnetism.

The method for producing a magnetic material of the present invention can be suitably used for producing the magnetic material of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A carbon nanotube composite material comprising:
a carbon nanotube; and
a continuous layer of a metal covering an inner surface of the carbon nanotube,
wherein the carbon nanotube is closed at one end and open at the other end.

2. A carbon nanotube composite material according to claim 1, wherein the continuous layer is an electrically deposited layer.

3. A carbon nanotube composite material according to claim 1, wherein the metal is a magnetic metal.

4. A carbon nanotube composite material according to claim 3, wherein the magnetic metal comprises at least one selected from the group consisting of Fe, Co, Ni, FeCo, FeNi, CoNi, CoNiP, FePt, CoPt and NiPt.

5. A carbon nanotube composite material according to claim 1, which has an average length of 1 μm or less.

6. A magnetic material comprising:
a carbon nanotube; and
a continuous layer of a magnetic metal covering an inner surface of the carbon nanotube,
wherein the carbon nanotube is closed at one end and open at the other end.

7. A magnetic material according to claim 6, wherein the magnetic metal comprises at least one selected from the group consisting of Fe, Co, Ni, FeCo, FeNi, CoNi, CoNiP, FePt, CoPt and NiPt.

* * * * *